US010679068B2

(12) United States Patent
Badr

(10) Patent No.: US 10,679,068 B2
(45) Date of Patent: Jun. 9, 2020

(54) MEDIA CONTEXTUAL INFORMATION FROM BUFFERED MEDIA DATA

(71) Applicant: Google Inc., Mountain View, CA (US)

(72) Inventor: Ibrahim Badr, Zurich (CH)

(73) Assignee: GOOGLE LLC, Mountain view, CA (US)

( * ) Notice: Subject to any disclaimer, the term of this patent is extended or adjusted under 35 U.S.C. 154(b) by 228 days.

(21) Appl. No.: 15/621,211

(22) Filed: Jun. 13, 2017

(65) Prior Publication Data

US 2018/0357487 A1 Dec. 13, 2018

(51) Int. Cl.
*G06F 9/00* (2006.01)
*G06K 9/00* (2006.01)
*H04N 21/462* (2011.01)
*G06F 16/432* (2019.01)
*G06F 16/951* (2019.01)
*G06F 16/783* (2019.01)
*G06F 16/683* (2019.01)
*G06K 9/72* (2006.01)

(52) U.S. Cl.
CPC ....... *G06K 9/00751* (2013.01); *G06F 16/434* (2019.01); *G06F 16/683* (2019.01); *G06F 16/783* (2019.01); *G06F 16/951* (2019.01); *G06K 9/72* (2013.01); *H04N 21/4622* (2013.01)

(58) Field of Classification Search
CPC combination set(s) only.
See application file for complete search history.

(56) References Cited

U.S. PATENT DOCUMENTS

| 7,389,181 | B2 | 6/2008 | Meadow |
| 7,689,613 | B2 | 3/2010 | Candelore |
| 7,788,266 | B2 | 8/2010 | Venkataraman |
| 8,316,019 | B1 | 11/2012 | Ainslie et al. |
| 8,321,406 | B2 | 11/2012 | Garg et al. |
| 8,391,618 | B1 | 3/2013 | Chuang |
| 8,392,435 | B1 | 3/2013 | Yamauchi |

(Continued)

OTHER PUBLICATIONS

Hu, W., Xie, N., Li, L., Zeng, X., & Maybank, S. (2011). A survey on visual content-based video indexing and retrieval. IEEE Transactions on Systems, Man, and Cybernetics, Part C (Applications and Reviews), 41(6), 797-819. (Year: 2011).*

(Continued)

*Primary Examiner* — Farhan M Syed
(74) *Attorney, Agent, or Firm* — Middleton Reutlinger

(57) ABSTRACT

Methods, systems, and apparatus, including computer programs encoded on a computer storage medium, for providing contextual information for presented media. In one aspect, a method includes storing in a buffer, on a first user device, media data as buffered media data, the buffered media data being a most recent portion of media data received at the first user device, the most recent portion inclusive of the media data received from a present time to a prior time that is fixed relative to the present time; responsive to a search operation invocation at the present time, sending the buffered media data to a search processing system that is remote from the first user device; and receiving, from the search processing system and in response to the buffered media data, contextual information regarding an entity that the data processing system identified from processing the buffered media data.

10 Claims, 5 Drawing Sheets

(56) References Cited

U.S. PATENT DOCUMENTS

| | | | |
|---|---|---|---|
| 8,498,994 B2* | 7/2013 | Prabaker | G06F 21/6218 |
| | | | 707/749 |
| 8,515,185 B2 | 8/2013 | Lee | |
| 8,521,764 B2 | 8/2013 | Pfleger | |
| 8,606,781 B2 | 12/2013 | Chi et al. | |
| 8,756,221 B2* | 6/2014 | Prabaker | G06F 21/6218 |
| | | | 707/722 |
| 8,898,095 B2 | 11/2014 | Agrawal | |
| 9,171,180 B2* | 10/2015 | Prabaker | G06F 21/6218 |
| 9,264,785 B2* | 2/2016 | Mallinson | G06K 9/00758 |
| 9,424,283 B2* | 8/2016 | Prabaker | G06F 21/6218 |
| 9,747,285 B1* | 8/2017 | Laufer | G06F 16/29 |
| 2001/0053968 A1 | 12/2001 | Galitsky | |
| 2007/0060114 A1 | 3/2007 | Ramer et al. | |
| 2007/0071320 A1 | 3/2007 | Yada | |
| 2007/0140595 A1 | 6/2007 | Taylor | |
| 2007/0214131 A1 | 9/2007 | Cucerzan | |
| 2008/0046405 A1 | 2/2008 | Olds et al. | |
| 2008/0270110 A1 | 10/2008 | Yurick | |
| 2010/0306249 A1 | 12/2010 | Hill | |
| 2011/0035406 A1 | 2/2011 | Petrou et al. | |
| 2011/0038512 A1 | 2/2011 | Petrou et al. | |
| 2011/0125735 A1 | 5/2011 | Petrou | |
| 2011/0128288 A1 | 6/2011 | Petrou et al. | |
| 2011/0131241 A1 | 6/2011 | Petrou et al. | |
| 2011/0137895 A1 | 6/2011 | Petrou et al. | |
| 2011/0247042 A1* | 10/2011 | Mallinson | G06K 9/00758 |
| | | | 725/86 |
| 2012/0109858 A1 | 5/2012 | Makadia et al. | |
| 2012/0143817 A1* | 6/2012 | Prabaker | G06F 21/6218 |
| | | | 707/608 |
| 2012/0143917 A1* | 6/2012 | Prabaker | G06F 21/6218 |
| | | | 707/784 |
| 2012/0191745 A1 | 7/2012 | Velipasaoglu et al. | |
| 2012/0215533 A1 | 8/2012 | Aravamudan et al. | |
| 2013/0132361 A1 | 5/2013 | Chen et al. | |
| 2013/0346400 A1 | 12/2013 | Ramsey et al. | |
| 2014/0046935 A1 | 2/2014 | Bengio et al. | |
| 2014/0172881 A1 | 6/2014 | Petrou et al. | |
| 2014/0244689 A1* | 8/2014 | Prabaker | G06F 21/6218 |
| | | | 707/784 |
| 2015/0058318 A1 | 2/2015 | Blackwell | |
| 2016/0019241 A1* | 1/2016 | Prabaker | G06F 21/6218 |
| | | | 707/783 |
| 2017/0024577 A1* | 1/2017 | Prabaker | G06F 21/6218 |

OTHER PUBLICATIONS

International Search Report and Written Opinion issued in International Application No. PCT/US2018/018918, dated Apr. 20, 2018, 17 pages.
Makandar et al. "Preprocessing Step-Review of Key Frame Extraction Techniques for Object Detection in video," International Journal of Current Engineering and Technology, vol. 5(3), Jun. 17, 2015, 4 pages.
U.S. Appl. No. 13/069,978, filed Mar. 23, 2011, Taubman et al.
U.S. Appl. No. 13/906,889, filed May 31, 2013, Heiler et al.
U.S. Appl. No. 14/313,519, filed Jun. 24, 2014, Bakir et al.
"10 Mobile Astronomy Apps for Stargazers," [online][Retrieved on Apr. 29, 2014]; Retrieved from the Internet URL: http://mashable.com/2011/06/21/astronomy-mobile-apps/, 13 pages.
"Google announces Search by Image and Voice Search for desktop, revamped mobile search," [online][Retrieved on Apr. 29, 2014]; Retrieved from the Internet URL: http://www.engadget.com/2011/06/14/google-announces-search-by-imag . . . , 2014, 6 pages.
"Google's Impressive "Conversational Search" Goes Live on Chrome," [online][Retrieved on May 5, 2014]; Retrieved from the Internet URL: http://searchengineland.com/googles-impressive-conversational-search-goes-line-on-chrome-160445, 2013, 12 pages.
Zhang et al., "Probabilistic Query Rewriting for Efficient and Effective Keyword Search on Graph Data," Proceedings of the VLDB Endowment 6(14):1642-1653, 2013, 12 pages.
Hu et al, "A survey on visual content based video indexing and retrieval," IEEE, Nov. 2011, 23 pages.
PCT Written Opinion in International Appln. PCT/US2018/018918, dated May 16, 2019, 9 pages.
Truong et al., "Video abstraction: A Systematic Review and Classification," ACM Transactions of Multimedia Computing Communications and Applications, Association for Computing Machinery, Feb. 2007, 37 pages.

* cited by examiner

MEDIA CONTEXTUAL INFORMATION FROM BUFFERED MEDIA DATA

BACKGROUND

User devices now provide access to a wide variety of information. For example, digital image files, video and/or audio files, as well as resources for particular subjects or particular news articles, are accessible over the Internet. This information may be viewed in web browsers running on a user device and native applications running on a user device. Search engines crawl and index these resources to facilitate searching of the resources. Thus, for just about any subject in which a user may be interested, there is a large amount of information that is readily available to the user.

Many user devices are now also being used to consume streaming content, such as "on demand" video. For example, many users now watch television programs and other videos primarily by use of mobile devices or laptop computer and tablets. Additionally, many televisions that are now available have "smart" capabilities that enable the televisions to be used as web browsers and to run native applications that present content from particular content providers.

A user may desire information related to content that a user is viewing on a user device. Such information in this application is referred to as "contextual information," as the information desired by the user is in the context of the active web page or media. Some user devices can provide an image of content that is displayed in an active window of a user device. A search system processes the image to identify entities and concepts and performs a search for those entities and concepts, and then provides one or more search results to the user device.

SUMMARY

This specification describes technologies relating to media contextual information responsive to a portion of buffered media that encompasses at least a buffered time period.

In general, one innovative aspect of the subject matter described in this specification can be embodied in methods that include the actions of storing in a buffer, on a first user device, media data as buffered media data, the buffered media data being a most recent portion of media data received at the first user device, the most recent portion inclusive of the media data received from a present time to a prior time that is fixed relative to the present time; responsive to a search operation invocation at the present time, sending the buffered media data to a search processing system that is remote from the first user device; and receiving, from the search processing system and in response to the buffered media data, contextual information regarding an entity that the data processing system identified from processing the buffered media data. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Contextual information about media consumed by a user on a user device can be determined from buffered media data and presented to the user. This enables a user to receive additional information about the consumed media.

In some implementations, the contextual information provided using the buffered media data can be query-independent, which eliminates a user's need to seek information using a search query that expresses the user's specific informational need. Instead, the user's informational need is expressed by the content of the buffered media data. Accordingly, when considered in the aggregate, thousands of erroneous and inaccurate queries are avoided, which, in turn, provides a more efficient use of search system resources. In other words, multiple erroneous query processing cycles are avoided, which reduces processing resources required and reduces overall system bandwidth requirements (or, alternatively, enables a larger number of users to be serviced without a commensurate increase in processing resources). This improvement in the technological field of search processing is thus another distinct advantage realized by the systems and methods described below.

In other implementations, the contextual information from buffered media data can be augmented with a user's search query, e.g., by a voice command such as "Show me what other movies he was in." This results more efficient use of server-side query resources (e.g., querying processing and bandwidth) because the search system can use the contextual content of the buffered media data to refine the search query. This also improves the technological field of search processing and information provided to the user, and is thus another distinct advantage realized by the systems and methods described below.

In still other implementations, when the buffered content is video content, the buffered content may be a series of individual frames that each requires a threshold change in content from a prior video frame. Such buffering results in a smaller set of video data that is transmitted than if the buffering stored every frame of video. Moreover, by requiring each video frame that is buffered to have the threshold change in content from a prior video frame, the information loss due to not storing each video frame is reduced. This also improves the technological field of search processing and information provided to the user, as the buffered data that is sent is relative compact, which conserves bandwidth, but does not suffer from a concomitant information loss, which reduces the impact on information gain from the data.

The details of one or more embodiments of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Overview

Figure 1A:
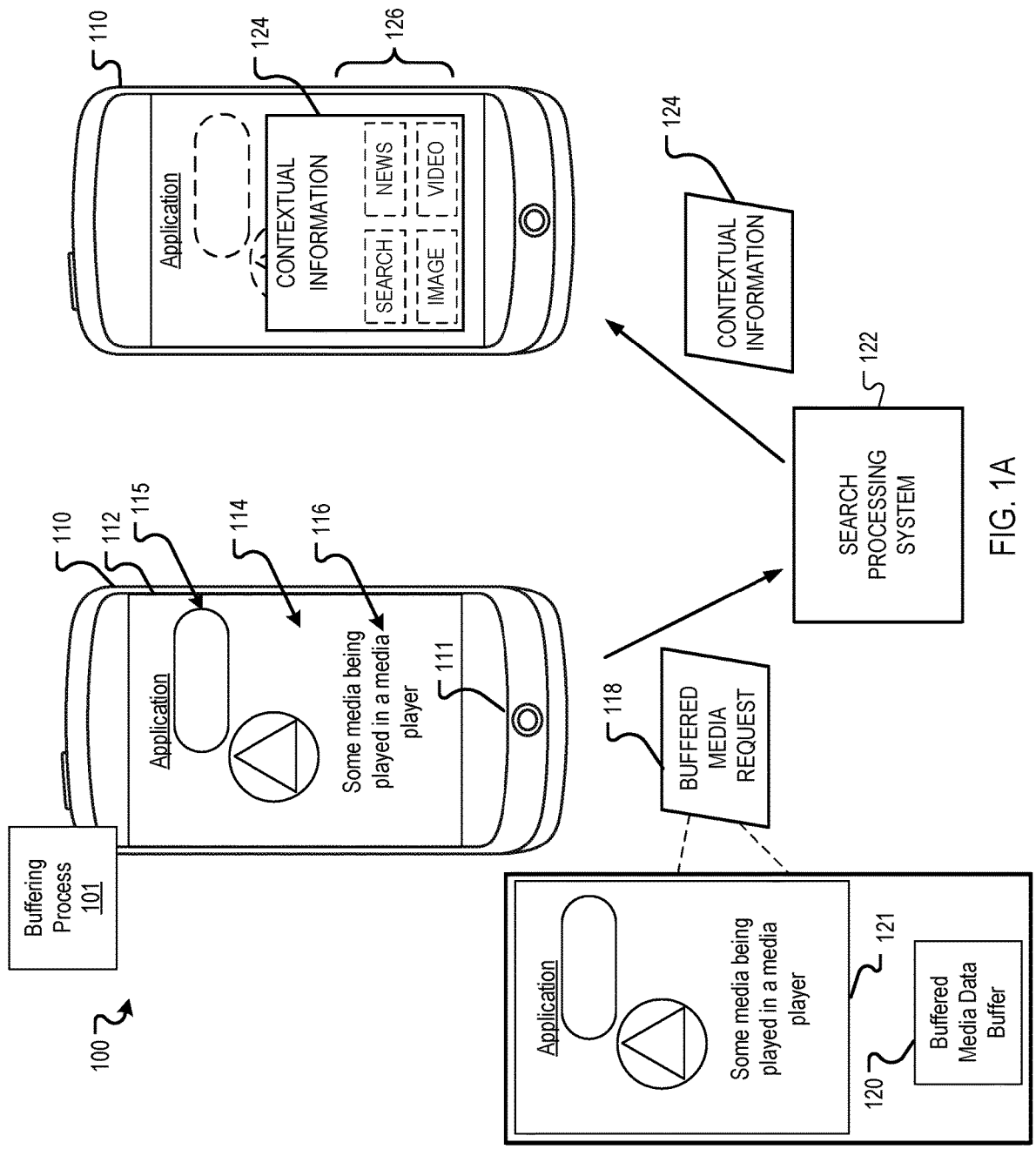
FIGS. 1A and 1B are block diagrams of example environments in which contextual information about buffered media is provided.

A user may desire information related to content that a user is viewing on a user device. Such information in this application is referred to as "contextual information," as the information desired by the user is in the context of the active web page or media. Some user devices can provide an image of content that is displayed in an active window of a user device. A search system processes the image to identify entities and concepts and performs a search for those entities and concepts, and then provides one or more search results to the user device. However, a most recent frame of video does not always accurately express the user's informational need. For example, a user may be watching a basketball game, and desire information about a particular player shooting a free throw. If the user invokes a search just after the video switches to another view, e.g., multiple players attempting to catch a rebound from the missed shot, the image may not accurately depict the interest of the user, i.e., the player that is shooting the free throw. Moreover, for audio data, such as a song, a screen shot or image of an active window is even less likely to accurately convey the user's informational need.

A user device implementing the systems and methods described below enables determining contextual information from buffered media data for content consumed at a user device. The buffered media data is stored in a buffer on the user device. Typically, this buffered media data includes media for a predefined amount of time for the most recently consumed content at the user device. This predefined amount of time is also referred to as a "buffered time period." The buffered time period is inclusive of a time period that provides for multiple frames of video and/or multiple audio samples for audio data. For example, the buffered media data may include the last 5-10 seconds of previously consumed media.

In some implementations, the buffered media data can be for media data consumed from two or more active applications running on a user device. The media data for each of the multiple applications is stored in a buffer as separate respective instances of buffered media data. When a search operation is invoked that requires the buffered media, in some implementations, the application for which the user device has a primary focus is determined, and the only the buffered media data for the executing application for which the user device has a primary focus is selected and sent to the search processing system.

Responsive to a search operation invocation at a present time, the user device sends the buffered media data to a search processing system. The invocation of the search operation can be the result from different types of user interaction models. One interaction model requires a non-textual user input, such as the prolonged pressing of an input button. Another interaction model requires a textual user input, such as the typing in or speaking of a query. Search operation invocation is described in more detail below.

Contextual information regarding an entity or entities that the data processing system identified from processing the buffered media data is then provided to the user device in response. The data may be provided in a variety of ways, and the way the results or results are presented may depend on the query. For example, if the query issues an informational query, e.g., "Tell me about that player shooting the free throw," then the data may be a list of search results. Conversely, if the query has a dominant intent, e.g., a query about a particular characteristic of a particular person, e.g., "Show me the shooter's free throw percentage and other stats for the season," then the results may be presented as a single response, or in the form of a contextual card.

In some implementations, the user can consume media on one device and receive contextual information on a second device that is different from the first. For example, a user may consume media on a television and receive the contextual information on a mobile device (e.g., tablet, mobile phone, etc.).

These features and additional features are described in more detail below.

Example Operation Environments

Figure 1B:
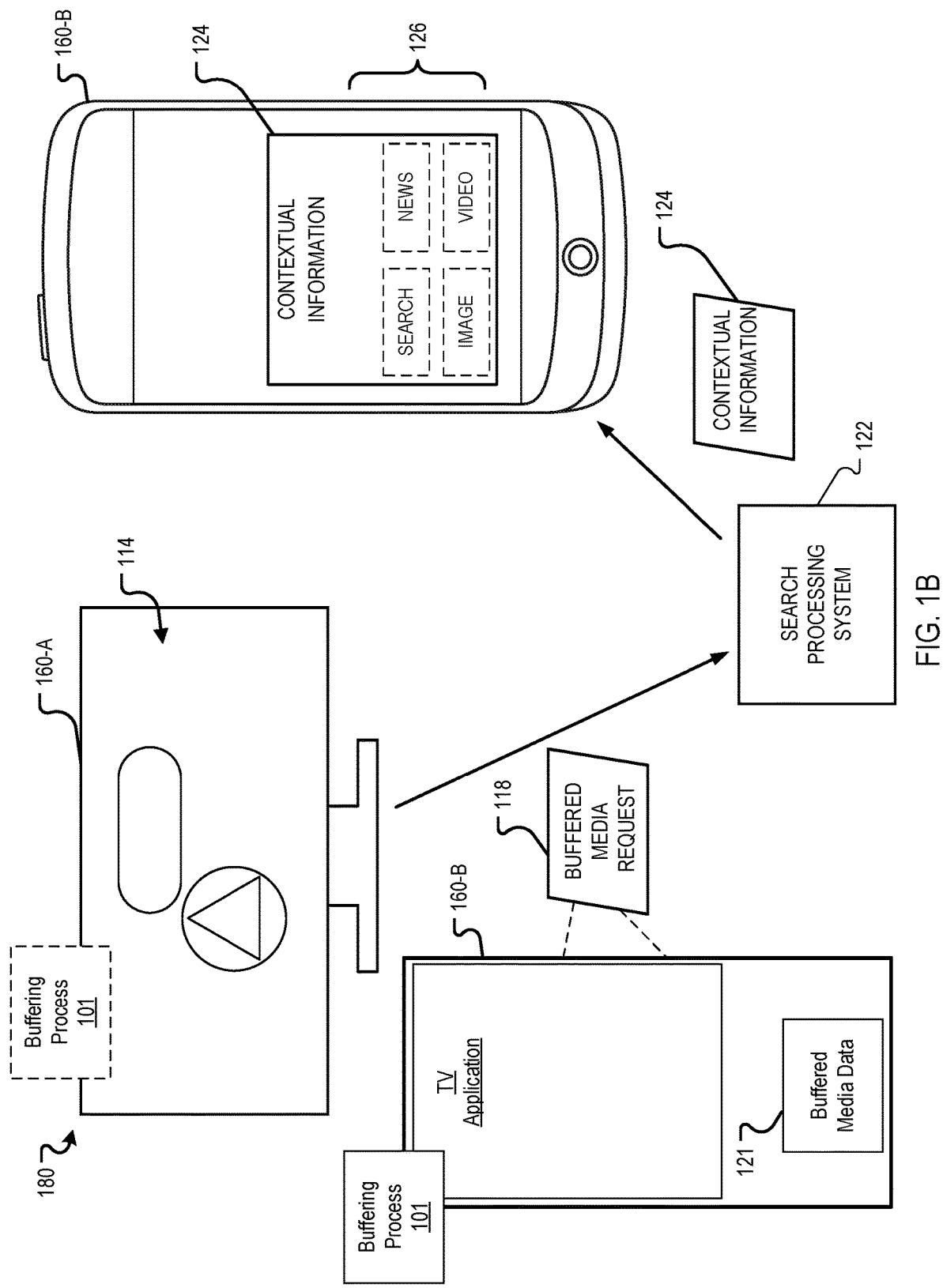

FIGS. 1A and 1B are block diagrams of example environments in which contextual information about buffered media is provided. FIG. 1A depicts requesting contextual information and receiving a contextual information card during presentation of media, and FIG. 1B depicts presenting media on a first user device and presenting the contextual information card on a second different user device.

With reference to FIG. 1A, a user device 110 is used to obtain contextual information for media consumed at the user device 110. The user device 110 is an electronic device that is capable of requesting and receiving resources over a network. Example user devices 110 include mobile communication devices (e.g., smart phones, tablets, laptop computers, etc.), and other computing or computer devices (e.g., televisions, desktops, etc.) that can send and receive data over a network, such as the Internet.

The user device 110 can display information, such as web resources. These may include HTML pages, electronic documents, images files, video files, audio files, text message conversations, e-mails, graphical user interfaces of applications, etc. In addition, as depicted in FIG. 1A, the user device 110 can present media 114 using an application 112. Media 114 is images, video, audio, text, or some combination of the like that a user consumes using an application running on a user device 110. For example, the media 114 may be a professional basketball game presented at the user device using an application 112 from a sports broadcasting provider.

The application 112 can include native applications and/or browser-based applications. As used herein, a native application generates environment instances for display on a user device within an environment of the native application, and operates independent of a browser application on the user device. A native application is an application specifically designed to run on a particular user device operating system and machine firmware. Native applications thus differ from browser-based applications and browser-rendered resources. The latter require all, or at least some, elements or instructions downloaded from a web server each time they are instantiated or rendered. Furthermore, browser-based applications and browser-rendered resources can be processed by all web capable user devices within the browser and thus are not operating system specific.

The user device 110, by use of a buffering process 101, stores buffered media data 121 in a buffer 120. The buffered media data 121 is visually depicted as a most recent frame of video of multiple video frames stored in the buffer 120. The buffered media data 121 is a most recent portion of streaming media data received at the first user device. The most recent portion inclusive of the streaming media data received from a present time to a prior time that is fixed relative to the present time and includes multiple frames of video or multiple samples of audio data. For example, the buffered media data 121 may include the last 5, 10, 15, or 20 seconds of previously consumed media.

In FIG. 1A, the user device 110 is presenting media 114, and the user has invoked a search operation and sent a buffered media request 118 to the search processing system 122. A search operation can be invoked a number of different ways, and will be described in more detail below. The search processing system 122 process the buffered media data 121 that is sent with the buffered media request 118, and provides contextual information 124 in response. In the example shown in FIG. 1A, the contextual information is provided in the form of a contextual card 124 user interface element. However, other user interface elements may be used, for example, chat bubbles, selectable linked notes or footnotes, etc. The contextual information card 124 may include contextual information about the media 114 presented by the application 112, such as images, text, audio, and video, and one or more commands 126.

The commands 126 can include a search command that may invoke a separate search in a search user interface, a reviews command that may retrieve reviews of the media, and a share command, which may generate a screen shot of the application 112 and a URI of the environment instance and send the screen shot and the URI to another user device.

In addition, the commands 126 can include a questions command that may provide additional questions a user can ask about the contextual information or the topicality of the contextual information. When a user interacts with one of the additional questions, the user device 110 invokes a separate search query or request seeking results or answers for the additional question. The user device 110 will receive the answer to the separate search query, as either an additional contextual card, a different user interface, etc.

The contextual card 124 is but one example of how contextual information may be provided. Other ways of providing contextual information include search results that link to resources, an answer if the buffered media request 118, along with query terms input by the user, is interpreted as a question, and the like.

FIG. 1A shows the contextual information being presented on the user device 110. However, contextual information can be presented on a device that is separate from a device that is displaying the media data. For example, FIG. 1B is a figure that depicts presenting media on a first user device 160-A and presenting the contextual information on a second different user device 160-B. In this example, the user device 160-B is executing an application that controls the displaying of media on the user device 160-A. For example, the application may be a TV application that allows the user, by use of the user device 160-B, to select content and change channels for the user device 160-A. The user device 160-B may also execute a buffering process 101 as described with reference to FIG. 1A. Alternative, the user device 106-A may execute the buffering process and store the buffered media data, as indicated by the phantom process 101 on the user device 160-A.

The user device 160-B, which may be, for example, a mobile device or tablet computer, may be used to invoke a search operation in the same manner as described with reference to FIG. 1A, and as will be described in more detail below. Again, the buffered media request 118 is sent to the search processing system 122 (either from the user device 160-B, if the user device 160-B is storing the buffered media data, or from the device 160-A, if the device 160-A is storing the buffered media data). The search processing system 122 receives the buffered media request 118 and data indicating results are to be sent to the user device 160-B. The search processing system 122 then provides the contextual information to the user device 160-B.

In an alternative implementation, the search operation may be invoked by use of the user device 160-B, but the contextual information may be displayed on the user device 160-A. For example, if multiple persons are watching a sports program, the user device 160-B may be used to invoke a buffered media request by one of the persons and the results may be displayed on the device 160-A for all persons to see.

Buffered Media Data

As described above, the buffered media data is a most recent portion of streaming media data received at the first user device. The most recent portion of the media data is inclusive of the media data received from a present time to a prior time that is fixed relative to the present time. For example, if the prior time is 20 seconds, then the buffered media data is for the last 5 seconds of presented media. In some implementations, more the buffered media data may be for a longer period of time than what is sent in a buffered media request. For example, the buffered media data may store data for up to 30 seconds, but only send buffered media data that corresponds to only the last five seconds of data. Should the user indicate dissatisfaction with the contextual information provided, then the user device may send additional buffered media data in a next request, e.g., for the last 20 seconds.

The user device 110 can buffer media data 121 from multiple active applications. An active application is an application running on the user device 110 that a user is engaging with. For example, if a user is listening to music using a media application and viewing a video weather report using a weather application or using a web browser, the user device receives buffered media data 121 from the media application 112 and the weather application/web browser. In addition, the media data for each of the multiple applications is stored in a buffer as separate respective instances of buffered media data. When a search operation is invoked that requires the buffered media, in some implementations, the application for which the user device has a primary focus is determined, and only the buffered media data for the executing application for which the user device has a primary focus is selected and sent to the search processing system.

In some implementations, the primary focus is determined by an active window. For example, if a user is watching the weather video and the audio player window is in the background while presenting a song, the application showing the weather video is determined to have the primary focus. Alternatively, if the user utters a query, the primary focus may be determined, in part, by the query terms. For example, assume the user is watching the weather video and the audio player window is in the background. The user utters the query "Assistant, who is the lead singer?" Using semantic rules, the user device will determine that the dominant intent of the verbal input to media being presented. In this example, the dominant intent based on the query terms "lead singer," relates higher to the song than to the weather video, and thus the system will select buffered media data of the song for processing.

In some implementations, the user device 110 samples a media frame from the received media data according to an interval number of video frames. This is done to conserve space when buffering video media data. For example, the user device may only sample every nth frame of the media data, where N can include any number, for example, every second frame, fifth frame, tenth frame, etc. The user device 110 stores each sampled media frame in the buffer. The user device 110 stores samples media frames to reduce the amount of buffered media data 121 stored in the buffer for each active application. This enables the buffer to capture the same amount of media using less data.

In some implementations, the user device 110 stores media frames based on a threshold change of content between adjacent media frames. The user device 110 determines, for each media frame, whether the media frame has a threshold change in content from a previously received media frame. The threshold change in content can be based on a totality of change in the content presented in the adjacent frames, a change in the dominate content presented in the adjacent frames, or a combination thereof. Any appropriate image processing technique can be used to determine a measure of change between video frames. The threshold change in content can be based on similarity scores of content presented in the media frame. A similarity score indicates how similar the content in a particular frame is to the content in a prior frame. Edge detection, scale invariant transform processing, and color distribution are example processing techniques that can be performed on each frame and the results compared to determine the similarity of content between the frames. For example, and continuing with the basketball example, if a first frame presented and stored includes the particular player shooting a free-throw shot and the next frame presented is a frame that includes sports announcers, the user device will detect, by use of the image processing techniques, a threshold change of content from the particular player to the sports announcers. In this instance, the user device 110 stores the sports announcer frame, because a threshold change in content occurred.

In some implementations, the buffer erases the buffer media data, each time the buffered media data is sent to the search processing system 122. In other implementations, the user device sends a portion of the buffered media data stored in the buffer, but does not erase the portion of buffered media data that is sent to search processing system 122. In other implementations, the buffer stores a predefined amount of time and erases buffered media data according to a first in first out data storage scheme.

Search Operation Invocation

Responsive to a search operation invocation at a present time, the user device sends the buffered media data to a search processing system. The invocation of the search operation can be the result from different types of user interaction models. One interaction model requires a non-textual user input, such as the prolonged pressing of an input button. When such an action is detected, the user device generates a query-independent search request that sends the buffered media data to the search system for processing. The request is "query-independent" the request does not include a query that includes terms that were directly input by the user.

When the user device 110 invokes a search operation without verbal or textual input from the user, the user device 110 sends the buffered media request 118 to the search processing system 122 as a query-independent request. The query-independent request 118 includes the buffered media data 121 and does not include query terms input by the user. However, the buffered media request 118 may include other data even if it is query independent, such as a URI for the source of the buffered media, the application presenting the media data, and the like.

One way to invoke a search operation without verbal or textual input from the user is by a prolonged pressing of an input button. For example, the user device 110 may be presenting some media 114 in an application 112. The media 114 includes, for example, some video that may include graphics 115 and text 116. The user may generate an indication for contextual information, e.g., by pressing a button 111, e.g., a "home" button, for three seconds (i.e., long press) or tapping the screen according to a predefined tap pattern, etc. In response, the user device sends a buffered media request 118 as a query-dependent request to the search processing system 122. In addition, the buffered media 121, the request may also include information about the media application, the URI of the source of the received media, and other information that are not query terms input by the user.

Other ways of generating a query-independent request can also be used. For example, in some implementations, the user device 110 can provide buffered media data to the search process system 122 periodically. The user device 110, pursuant to a user selection to send the buffered media data periodically, may send a query-independent request to the search processing system 122 every N seconds, e.g., where N is every 10, 20 or 30 seconds. For each iteration, the search processing system 122 determines contextual information for the particular portion of received buffered media data 121 and sends the determined contextual information to the user device 110. Thus, the user device 110 receives contextual information about the buffered media data stored in the buffer iteratively and according to a set period of time. Periodic updates of information may be useful when watching sporting events, for example. In such operation, a user may be provided with updated statistics that are relevant to what has been previously displayed. For example, during a basketball game, when a player is shooting a free throw, statistics specific to the player may be presented. However, when the video depicts all the players of both teams, then statics regarding each team and the game history between the teams may be presented.

In another implementation, the user device sends a query-independent request to the search processing system 122 based on a threshold change in content presented in the media. The threshold change can be done in the same manner as described above. Once a threshold change in content is detected, the user device generates a query-independent request for contextual information and sends the request to the search processing system 122.

Another interaction model is a user input that includes search terms and that includes a signal to include the buffered media data, either by typing in a query or speaking a query using an assistant process or voice recognition process. Such a signal may also require that the query be ambiguous, or the query specify the media data. For example, assume a query uttered to an assistant and is ambiguous, e.g., "What is his free throw percentage for the season?" The user device, using a semantic model, will determine the pronoun "his" does not include an antecedent, and thus will include the buffered media data with the query. Alternatively, where the query uttered to the assistant refers to the buffered media, e.g., "Tell me more about the lead singer of the song I'm listening to", the user device will determine that the noun "song" and the verb "listening" in the phrase means the query refers to the song currently being presented by the user device, and may send the query and the buffered media to the search system.

Conversely, when the query is well formed and not ambiguous, e.g., "What is today's weather forecast?", then the assistant process will not provide the buffered media with the query. This is because a well formed query that is not ambiguous and that is not determined to refer to the buffered media is interpreted by the user device, by use of semantic processing, as complete expression of the user's informational need.

Example User Device Process Flow

Figure 2:
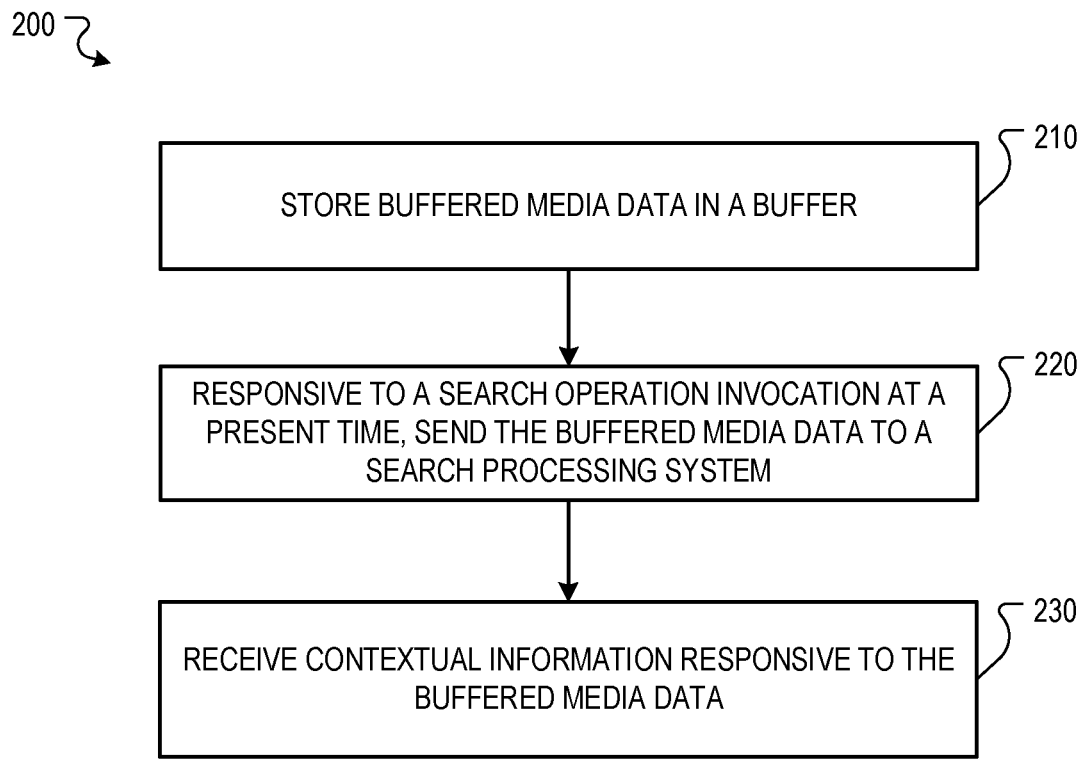
FIG. 2 is a flow diagram of an example process for providing buffered media data to receive contextual information.

FIG. 2 is a flow diagram of an example process 200 for providing buffered media data to receive contextual information. The process 200 is implemented in a user device. The buffered media data is a most recent portion of streaming media data presented at the user device, and is inclusive of the media data presented from a present time to a prior time that is fixed relative to the present time.

The user device stores buffered media data in a buffer (210) For example, the user device may be executing a buffering process 101 that buffers media data, such as streaming audio and video media, or audio and video media that is being played from a stored recording on the user device, in a memory buffer on the user device.

The user device, responsive to search operation invocation, sends the buffered media data to a search processing system (220). The data processing system is distinct from the first user device 160-A and the second user device 160-B. In some implementations, the data processing system 122 determines contextual information of the buffered media data 121. The search operation invocations may be done as described above, e.g., by a long press of a button; by an assistant process receiving a voice input; by a user inputting a text query; or by a periodic process that automatically sends the buffered media data to the search processing system. The buffered media data may be sent as query-independent request, or with a query, as described above.

The user device (or another user device separate from the sending user device) receives contextual information responsive to the buffered media data (230). The contextual information may be in the form of search results, a contextual card, an answer, or any other form that the search system determines is appropriate for the buffered media data request. The user device may then display the information to one or more users.

Search Processing System

Figure 3:
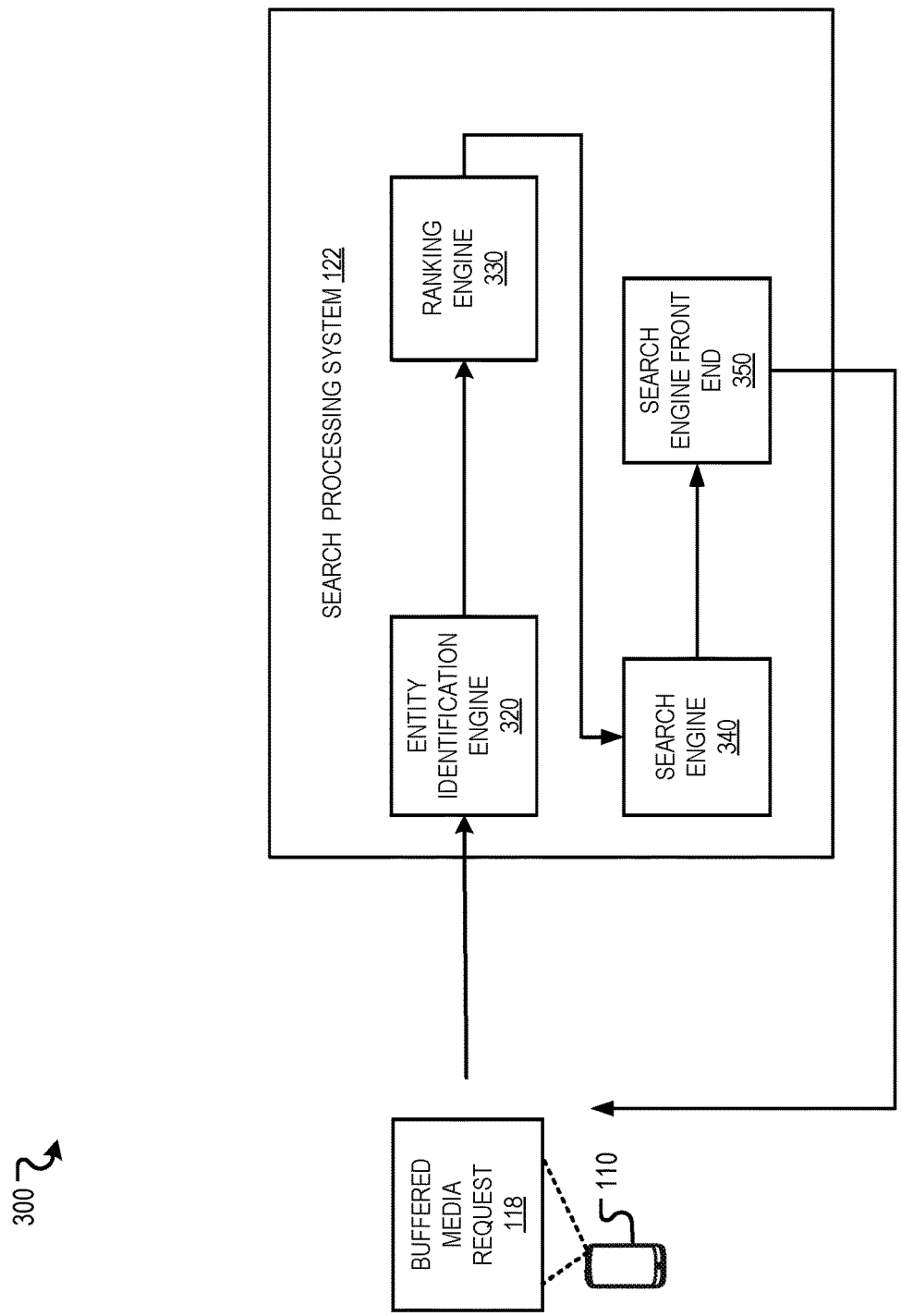
FIG. 3 is a block diagram of an example search processing system that processes a buffered media data request.
Figure 4:
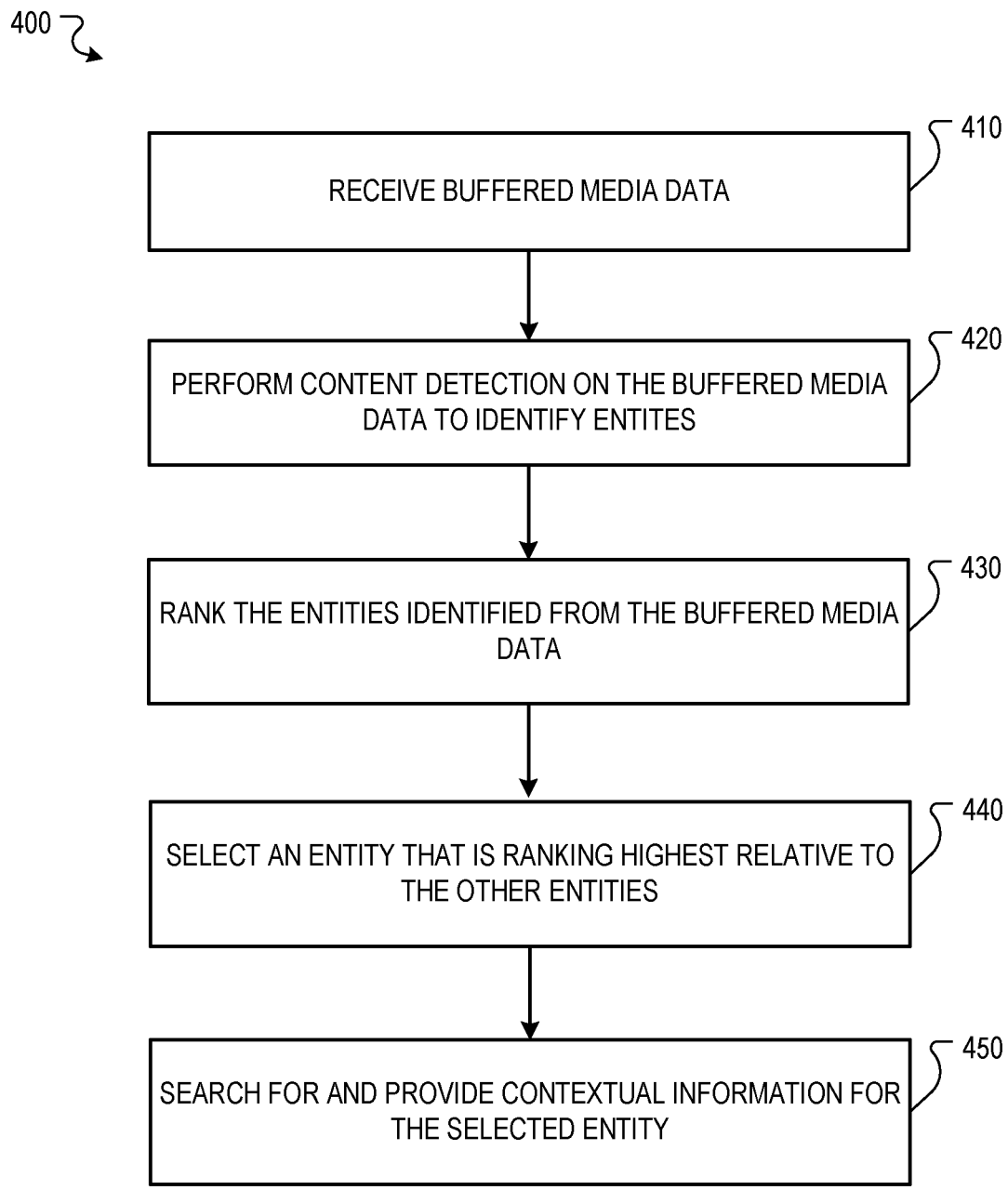
FIG. 4 is a flow diagram of an example process for providing contextual information based on buffered media data.

An example search processing system is shown in FIG. 3, and FIG. 4 describes an example process for providing contextual information in response to a buffered media data request. The data processing system 122 includes an entity identification engine 320, a ranking engine 330, a search engine 340, and a search engine front end 350. The search processing system 122 can process the buffered media data in a variety of ways. For example, video media can be processed for audio recognition, object recognition, person recognition and character recognition. Based on the results, the search system can form a query to search one or more corpora. Additionally, if a query is received with the buffered media request, then the query can be augmented with the results. Similarly, with audio data, voice and speech recognition can be used, as well as audio track matching, to identify songs, speeches and other relevant information to which the audio data pertains. The search engine, based on the audio processing results, can form a query to search one or more corpora.

One example search processing system 122 is described with reference to FIG. 3. The process 400 of FIG. 4 can be implemented in the search processing system, and operation of the search processing system is described with reference to FIG. 4.

The search processing system 122 receives the buffered media data (410). For example, the search processing system 122 receives the buffered media data request 118 to provide contextual information responsive to the buffered media request.

The entity identification engine 320 performs content detection on the buffered media data to identify entities (420). An entity may be one or more topical items of content within the media. For example, the text, sound, graphics and video may relate to particular persons, places, things or concepts. For example, in the frame with the particular basketball player shooting a free throw, the entities can include the particular player, the game of basketball, the player's team, the opposing team, the National Basketball Association, and the like.

The entity identification engine 320 processes the audio portions and video portions (if any) of the buffered media. In some implementations, the image portions are a frame of a video image. For video in the buffered media data, the entity identification engine 320 maintains the positional integrity of the sound and the accompanying frames of the video technology. Thus, a mapping of sound to video frame is created for analyzing the media.

The entity identification engine 320 uses optical character recognition (OCR) to identify entities within the image portions of the buffered media data. A variety of OCR algorithms can be used to identify the entities. The OCR algorithms derive text and graphics from the buffered media data. The entity identification engine 320 analyzes each frame to determine which entities are present in each frame. The OCR algorithms use the derived text and object recognition to give each entity a label. The label is a naming convention for the entity.

In addition, the entity identification engine 320 can, in some implementations, determine the position of each entity relative to other entities included in the frame, and the amount of the display that each entity occupies. For example, assume a presented frame includes a torso and head shot of particular player shooting a free-throw shot and also includes a shot of another player standing behind the particular player. Also assume the head and torso of the particular player take up 50% of the display area, and the image of the other player takes up 10% of the display area. The entity identification engine 320 can generate proportionality scores for the particular player and the other player, which are dependent on the amount of display area an object occupies. Here, the proportionality score will be higher for the particular player than for the other player. This score can be used by the ranking engine 330 to rank the entities.

In addition, the entity identification engine 320 can, in some implementations, determine the time of each entity relative to other entities included in the buffered media data and/or the amount of overall time that each entity is displayed. For example, for a five second portion of buffered video, assume that from seconds five to four (measured in the past from the present time), sports announcers are shown; then from seconds four to the present time, the particular basketball player is shown. The particular basketball is displayed closest in time to the present time, and occupies 80% of the buffered media time, while the sports announcers are most distant in time, and occupy 20% of the buffered media time.

The ranking engine 330 ranks the entities identified from the buffered media data (430). Any appropriate ranking process may be used. In some implementations, the entities within content of the buffered media data at a time closer to current time are prioritized higher than entities within content of the buffered media data at a time further away from current time. Referring back the basketball game example, because the particular basketball is displayed closest in time to the present time, and occupies 80% of the buffered media time, while the sports announcers are most distant in time, and occupy 20% of the buffered media time, the particular basketball player will have a higher ranking than the sports announcers. A variety of time ranking functions may be use, e.g., $$r(e) = f(t\_recency, t\_duration \%)$$

where r(e) is a rank score for entity e;

t_receny is a time measure from the most recent time of the buffer data that the entity was last depicted (or mentioned, for audio data) with a minimum value of 0;

t_duration is a time measure of the duration of the buffered video time that the entity is depicted in the buffered video, with a maximum value of 100%; and f( ) is a ranking function.

In some implementations, the ranking engine 330 also prioritizes entities within the frame of the media based on the determined locations of the entities. For example, entities that are closer to the foreground relative to entities that are further in background receive higher priority. For example, in a video with sports announcers in the foreground and basketball players in the background warming up, the sports announcers receive higher priority than the basketball players do because the sports announcers are in the foreground and the basketball players are in the background. In some implementations, the proportionality scores can be used to determine whether an entity is in the foreground or background relative to other entities.

Other ways of ranking entities can also be used instead of, or in addition to, the processes described above. For example, if query terms are provided with the buffered media data, the query terms may be used to weigh the entities detected in the buffered media data. Alternatively, or in addition, the entities may be used to disambiguate the query terms, as described above.

The ranking engine 330 selects an entity that is ranking highest relative to the other entities (440). Alternatively, the top N ranked entities may be selected, where N=2 or more. In another implementation, if several entities are top ranked and have very similar ranks scores, and then there is a significant break in the ranks scores for a next ranked entity, then the several entities with the top rank may be selected. In this latter implementations, piecewise linear interpolation beginning from the top ranked entity may be used to determine a significant break in rank scores. The item selection engine receives the identified entities and the ranking for each of the entities. Based on the entities that are identified entities, the one or more highest ranked entities are identified and transmitted to the search engine 340.

If a query is provided with the buffered media data, the query may be used to determine how many entities to select. For example, if the query is "What is his free throw percentage?", then only one entity may be selected, as the query speaks of a subject in the singular. However, if the query refers to a plural, e.g., "What are their names?" then two or more entities may be selected.

The search engine 340 conducts a search on the entity or top ranked entities and provides the resulting contextual information to the user device (450). The search engine 340 may use the entities and, if provided, the query terms to conduct the search of one or more corpora. A variety of query rewriting, synonym generation, and other query processing algorithms can be used. The contextual information that is provided may be in the form of a contextual card, a series of search results, an answer and an interpreted question, or other forms.

Additional Implementation Details

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML, page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
    storing in a buffer, on a user device, media data as buffered media data, the buffered media data being a most recent portion of media data received at the user device, the most recent portion inclusive of the media data received from a present time to a prior time that is fixed relative to the present time, wherein storing in the buffer the buffered media data comprises:
        determining, for a media frame of the received media data, whether the media frame has a threshold change in content from a previously received media frame; and
        storing, in the buffer on the user device, the media frame in response to determining the media frame has a threshold change in content from a previously received media frame;
    responsive to a search operation invocation at the present time, sending the buffered media data to a data processing system that is separate from the user device, wherein the search operation invocation is determined by an assistant process executing on the user device that a user has requested a search operation; and
    sending the buffered media data comprises:
        receiving, by the assistant process executing on the user device, a search query;
        determining that the search query is determined to be an ambiguous query; and
        only in response to determining that the search query is determined to be an ambiguous query, sending the buffered media data with the search query to the data processing system; and
        wherein the buffered media data is not sent when the search query is not determined to be ambiguous; and
    receiving, from the data processing system and in response to the buffered media data, contextual information regarding an entity that the data processing system identified from processing the buffered media data.

2. The computer-implemented method of claim 1, wherein receiving contextual information comprises receiving a user interface element at the user device.

3. The computer-implemented method of claim 1, wherein:
    sending buffered media data to a data processing system that is remote from the user device comprises iteratively sending, according to a predefined time period, buffered media data to the data processing system; and
    receiving contextual information comprises receiving contextual information regarding the entity for each portion of buffer media data sent for each iteration.

4. The computer-implemented method of claim 1, wherein:
    storing in the buffer the buffered media data comprises:
        receiving media data from multiple applications; and
        storing the media data for each of the multiple applications as separate respective instances of buffered media data; and
    sending buffered media data to a data processing system that is remote from the user device comprises:
        determining, at the present time, an executing application for which the user device has a primary focus; and
        selecting as selected buffered media data only the buffered media data for the executing application for which the user device has a primary focus; and
        sending the selected buffered media to the data processing system.

5. The computer-implemented method of claim 1, wherein:
    the user device is a first user device; and
    receiving, from the data processing system and in response to the buffered media data, contextual information regarding an entity that the data processing system identified from processing the buffered media data comprises receiving the contextual information at a second user device that is separate from the first user device.

6. The computer-implemented method of claim 1, wherein receiving, from the data processing system and in response to the buffered media data, contextual information regarding an entity that the data processing system identified from processing the buffered media data comprises received the contextual information at the user device.

7. A system, comprising:
    a data processing apparatus; and
    a non-transitory computer readable storage medium in data communication with the data processing apparatus and storing instructions executable by the data processing apparatus and upon such execution cause the data processing apparatus to perform operations comprising:
        storing in a buffer, on a user device, media data as buffered media data, the buffered media data being a most recent portion of media data received at the user device, the most recent portion inclusive of the media data received from a present time to a prior time that is fixed relative to the present time, wherein the buffered media data comprises media frames that each are determined to have a threshold change of content from a respectively previous media frame;
        responsive to a search operation invocation at the present time, sending the buffered media data to a data processing system that is remote from the user device, wherein the search operation invocation is determined by an assistant process executing on the user device that a user has requested a search operation; and
        sending the buffered media data comprises:
            receiving, by the assistant process executing on the user device, a search query;
            determining that the search query is determined to be an ambiguous query; and
            only in response to determining that the search query is determined to be an ambiguous query, sending the buffered media data with the search query to the data processing system; and
            wherein the buffered media data is not sent when the search query is not determined to be ambiguous; and
        receiving, from the data processing system and in response to the buffered media data, contextual information regarding an entity that the data processing system identified from processing the buffered media data.

8. The system of claim 7, wherein receiving contextual information comprises receiving a user interface element at the user device.

9. The system of claim 7, wherein the search operation invocation is determined by an assistant process executing on the user device that a user has requested a search operation.

10. The system of claim 7, wherein:
storing in the buffer the buffered media data comprises:
   receiving media data from multiple applications; and
   storing the media data for each of the multiple applications as separate respective instances of buffered media data; and
sending buffered media data to a data processing system that is remote from the user device comprises:
   determining, at the present time, an executing application for which the user device has a primary focus; and
   selecting as selected buffered media data only the buffered media data for the executing application for which the user device has a primary focus; and
   sending the selected buffered media to the data processing system.

* * * * *